United States Patent
Ross (10) Patent No.: US 6,498,570 B2
(45) Date of Patent: Dec. 24, 2002

(54) OPTICAL HIGHWAY LINE DETECTOR

(76) Inventor: Phillip N. Ross, 4536 S. 250 West, Washington Terrace, UT (US) 84405

( * ) Notice: Subject to any disclaimer, the term of this patent is extended or adjusted under 35 U.S.C. 154(b) by 0 days.

(21) Appl. No.: 09/865,070

(22) Filed: May 24, 2001

(65) Prior Publication Data

US 2002/0175813 A1 Nov. 28, 2002

(51) Int. Cl.$^7$ ................................................. G08G 1/00
(52) U.S. Cl. ....................... 340/901; 340/904; 340/905; 340/942; 250/239; 250/397
(58) Field of Search .................. 340/901, 904, 340/905, 933, 942, 438, 439; 250/239, 397; 180/167, 169

(56) References Cited

U.S. PATENT DOCUMENTS

| | | |
|---|---|---|
| 3,708,668 A | 1/1973 | Tilley |
| 4,143,264 A | 3/1979 | Gilbert et al. |
| 4,348,652 A | 9/1982 | Barnes et al. |
| 4,401,181 A | 8/1983 | Schwarz |
| 5,229,602 A | 7/1993 | Juliger |
| 5,568,137 A | * 10/1996 | Liu ........................... 340/905 |
| 5,668,539 A | 9/1997 | Patchell |
| 5,790,403 A | 8/1998 | Nakayama |
| 5,957,983 A | 9/1999 | Tominaga |
| 5,979,581 A | 11/1999 | Ravani et al. |
| 5,982,278 A | 11/1999 | Cuvelier |

* cited by examiner

*Primary Examiner*—Daryl Pope
(74) *Attorney, Agent, or Firm*—Mallinckrodt & Mallinckrodt; Robert R. Mallinckrodt (57) ABSTRACT

A highway lane position detector including a photodetector for determining the existence of highway lines, wherein the detection circuitry maintains its detection ability over a wide range of ambient light conditions from bright sunlight to dim artificial light in ambient darkness, by providing a dynamic resistance element in series with the photodetector wherein the dynamic resistance element compensates for changes in the photodetector due to changes in ambient light conditions to maintain the photodetector in a detection condition (avoiding saturation) regardless of the ambient light condition. In the preferred embodiment of the detector, the dynamic resistance element is at least one reversed biased zener diode. In currently preferred circuitry of the invention, the detector detects the presence of intermittent lane dividing lines and provides an alarm when such lines are no longer detected.

28 Claims, 8 Drawing Sheets

OPTICAL HIGHWAY LINE DETECTOR

BACKGROUND OF THE INVENTION

1. Field

The invention is in the field of optical detection of lines on the surface of a highway from a moving motor vehicle.

2. State of the Art

Statistics from the National Highway Traffic Safety Administration show that vehicle lateral drift, i.e., drift from one lane to another or drift off the roadway, accounts for about 25% of fatalities on our nation's highways. As a result, President Clinton has mandated motor vehicle safety devices be developed to help solve the problem and President Bush has continued the mandate.

It has been realized since at least 1973, U.S. Pat. No. 3,708,668, that it would be desirable to have a device for motor vehicles that would detect highway lines and sound or display an alarm to alert the driver of the vehicle when the vehicle approached or crossed such a line so the driver could correct and stay within his or her lane and avoid unintentional lateral drift. The search for a practical device to provide satisfactory highway line detection has continued and a number of devices have been suggested.

It was recognized as early as U.S. Pat. No. 3,708,668 that a significant problem with such a system is compensating for different ambient light levels. Thus, such a system has to be able to detect road lines in bright sunlight as well as in darkness at night. U.S. Pat. No. 3,708,668 provides a pair of sensors that balance each other when both detect a road surface, but result in a warning signal when one sensor detects a light reflecting line and the other does not. U.S. Pat. No. 4,143,264 provides a bridge circuit with an impedance element controlled by an integrated output of the bridge circuit to maintain a balance of the bridge for ambient light conditions and vary sensitivity of the detector with light conditions. Various infrared, laser, and CCD camera devices have also been suggested, U.S. Pat. Nos. 4,348,652, 5,979, 581, 5,790,403, and 5,957,983. U.S. Pat. No. 5,982,278 shows various arrangements of detectors for detecting road lines and special line arrangements but does not teach any specific detection circuitry.

However, the need remains for a reliable line detector that can be built into a vehicle or provided as an aftermarket product to be easily mounted on a vehicle such as in or on side mirrors or mounted on one or more side windows of the vehicle.

SUMMARY OF THE INVENTION

As indicated, a major difficulty in the optical detection of highway lines is that the ambient light varies in intensity over many orders of magnitude from a sunny day to night. The detector must be able to accommodate these extremes, in particular during daytime, without current saturation. The inventor has discovered that the dynamic impedance characteristics of a reverse biased zener diode can be used to compress the voltage output signal of a phototransistor to accommodate extremes of light intensity. This approach is a simple and economical solution to the problem.

Dynamic impedance is, in general, defined as the incremental change in voltage across a device with respect to an incremental change in the current through the device.

The voltage at which the voltage across the reverse biased zener diode nearly ceases to increase with increases in current is referred to as the zener voltage. Zener diodes with various zener voltages are commercially available and should be chosen so that this voltage, or the series combination of these voltages, is below the saturation point of the photodetector in bright light, but so that the highest expected voltage across the zener diode in the series combination should always be less than the zener diode's or series combination of zener diode's zener voltage.

THE DRAWINGS

The best mode presently contemplated for carrying out the invention in actual practice is illustrated in the accompanying drawings, in which.

DETAILED DESCRIPTION OF THE ILLUSTRATED EMBODIMENTS

Figure 1:
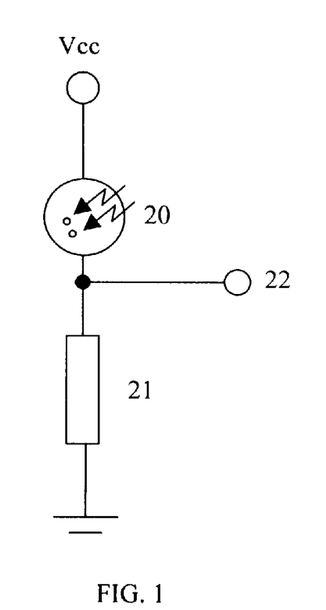
FIG. 1 is a schematic representation of a photodetector connected to a signal ground through a dynamic impedance element.

FIG. 1 shows the general arrangement of the compensating circuitry of the invention. Photodetector 20 is connected to signal ground through the dynamic impedance network 21 at junction 22. The output of this arrangement is the voltage difference between junction 22 and signal ground, i.e., the voltage across the dynamic impedance network or element 21. Generally, photodetector 20 will conduct more current with more light exposure. Thus, a photoresistor has reduced resistance as more light is exposed to it and a phototransistor or photodiode conducts more current with more exposure to light. In detecting road lines, the lines, which are usually white, will reflect more light than the road surface, even with a light concrete road surface. Thus, the voltage at junction 22 increases as more light is detected. This provides a positive voltage signal when a line is detected. However, with more ambient light on the road surface, such as in bright sunlight, the surface reflects more light than in darker situations, e.g., an overcast day, or at night with no ambient light on the road surface other than artificial light that may be supplied by the detector to the road surface. Thus, changes in the ambient light cause significant variation in voltage across the dynamic impedance element. It is the increase in voltage over and above the voltage caused by the ambient light on the road surface that must be detected.

Figure 2:
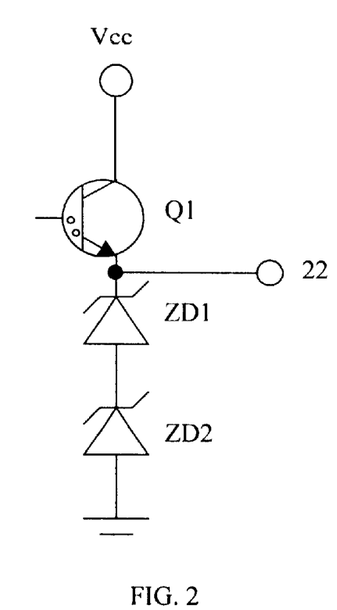
FIG. 2, a specific embodiment of the invention wherein the photodetector is a phototransistor and the dynamic impedance element is comprised of two reverse biased zener diodes.

A preferred embodiment of the invention is shown in FIG. 2. In this embodiment, the photodetector is a phototransistor Q1 and the dynamic impedance is supplied by two reverse biased zener diodes ZD1 and ZD2. Satisfactory zener voltages are in the range of 3.3–5.1 volts for each zener diode, although the zener voltages may vary depending upon the phototransistors used, whether photodetectors other than phototransistors are used, and other variables of the circuitry.

Figure 3:
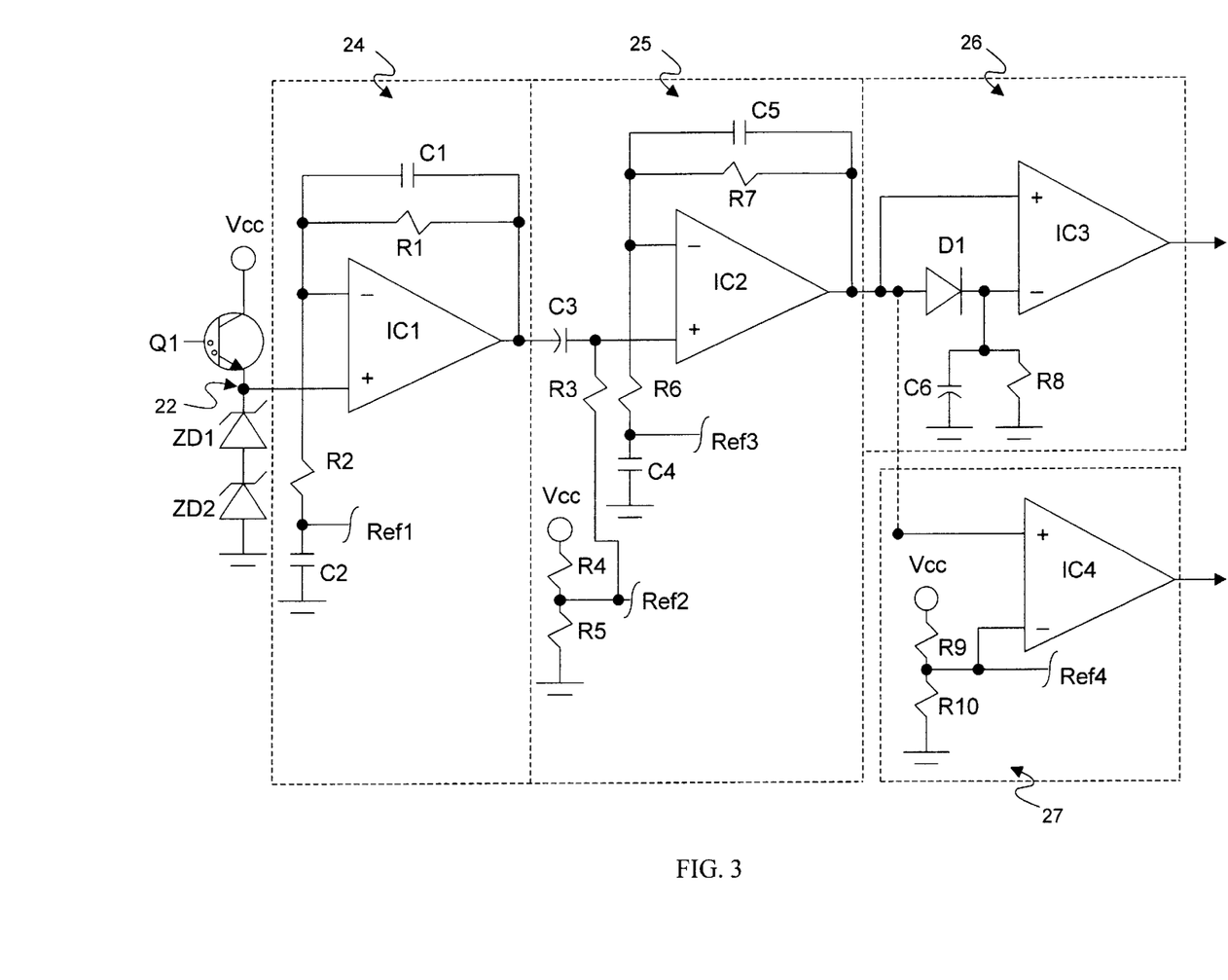
FIG. 3, a circuit diagram of an embodiment of a portion of the invention, including the components of FIG. 2 and interfacing electronics.

Satisfactory interface electronics for the motor vehicle line detector of the invention is shown in FIG. 3. The interface contains three functional circuits. The first of these is a detection amplifier 24 which amplifies the photodetector voltage signal. Following this detection amplifier is a second stage amplifier 25. Depending upon the amplification desired, the second stage amplifier 25 can include a series of individual amplifiers, only one amplifier being shown in the second stage amplifier circuit 25 of FIG. 3. Following the second stage amplifier, there is alternately a peak detector 26 or a voltage reference and detector circuit 27.

The output of the photodetection device at junction 22 is applied to the noninverting input of operational amplifier IC1 of the detection amplifier circuitry 24. It should be understood that the operational amplifiers shown in the various FIGS., as well as other component blocks representing integrated circuits, are supplied with positive voltage, +VCC, and are connected to ground as needed and in well known manner even though the supply voltage and ground connections are not shown. Feedback from the output of IC1 to the inverting input of IC1 is provided through resistor R1 and capacitor C1. This inverting input of IC1 is connected to ground through resistor R2 and capacitor C2 to produce a floating voltage reference level, Ref1, on the inverting input that varies with the ambient light conditions. In the circuitry shown, the voltage on the inverting input varies from about three volts (dark) to about nine volts (bright) depending on ambient light conditions and supply voltage. This approximately tracks the change in voltage at 22 on the noninverting input of IC1 with ambient light changes so that a change in ambient light does not produce an output signal from IC1. It is only an immediate change from background light (an increase in voltage over that produced by the background) that creates an output signal. A gain of amplifier IC1 of about 1.5 to 2 for the output signal has been found satisfactory.

The output of operational amplifier IC1, i.e., the output of the detection amplifier circuit 24, a positive signal when a line is detected, is coupled through a DC blocking capacitor C3 to the noninverting input of an operational amplifier IC2 in second stage amplifier circuitry 25. This noninverting input is connected to a second reference voltage, Ref2, through resistor R3. Reference voltage Ref2 is set by a voltage divider made up of resistors R4 and R5. A voltage of about 0.5 volts has been found satisfactory. The inverting input of operational amplifier IC2 is connected through resistor R6 to a floating reference voltage, Ref3, produced across capacitor C4. Again, a voltage value of about 0.5 volts has been found satisfactory. The inverting input also obtains feedback from the output of operational amplifier IC2 through feedback resistor R7 and capacitor C5. Satisfactory resistor and capacitor values are 680 k ohms for R7, 33 k ohms for R6, 2.2 mfd for C4, and 0.1 mfd for C6, giving a line detection signal gain for the amplifier IC2 of about 2.5. If desired, for greater amplification of the signal, or for other reasons, additional operational amplifiers may be included in the second stage amplifier circuitry 25.

The output of the final operational amplifier, here IC2, in the second stage amplifier circuitry 25 is then connected to the noninverting input of operational amplifier IC3 of the peak detector circuitry 26 or to the noninverting input of operational amplifier IC4 of the voltage reference and detector circuit 27. It should be realized that these are alternate circuits and only one is used. The peak detector 26 produces a negative pulse at the end of detection of a highway line while voltage reference and detector circuit 27 will produce a positive pulse at the beginning of detection of a line.

With the peak detector circuitry 26, the output of amplifier circuitry 25 is connected to the noninverting input of operational amplifier IC3, and also through diode D1 to the inverting input of the same operational amplifier IC3. The inverting input of operational amplifier IC3 is also connected to signal ground through the parallel connection of resistor R8 and capacitor C6.

When the output of the amplifier IC2 is constant or increases, the output of the operational amplifier IC3 will be at +Vcc because the voltage on the noninverting input of amplifier IC3 will be greater than that of the inverting input. This difference in voltage between the two inputs is caused by the voltage drop from the anode to cathode of the diode D1. When the signal from the output of IC2 increases, capacitor C6 charges rapidly so that the inverting input stays at a level near that of the noninverting input, but still less than the noninverting input. On the other hand, when the signal from IC2 decreases in magnitude, diode D1 becomes reverse biased forcing capacitor C6 to discharge through the resistor R8. The voltage on the inverting input of IC3 will therefore decline at a maximum rate determined by the RC time constant of the parallel resistor R8 and capacitor C6 combination. If the signal from the output of IC2 declines faster than the capacitor C6 can discharge, thereby providing a greater voltage on the inverting input of IC3, the output of IC3, goes low to ground. In this way, the end of the positive signal from IC2, the positive signal occurring where a line is detected, creates a single low going pulse. Thus, the output of IC3, which is the output of peak detection circuitry 26, is a negative going pulse at the end of each line detected. The length of the pulse is set by the time constant of the R8 and C6 RC parallel circuit.

Rather than the peak detector circuitry 26 as described, a voltage reference and detector circuit 27 could be used. With the circuit 27, the output of IC2 is connected to the noninverting input of operational amplifier IC4 used as a comparator. A reference voltage, Ref4, is generated by the voltage divider made up of R9 and R10 and is connected to the inverting input of IC4. Any input from IC2 above the voltage of Ref4 generates a positive output of IC4 while a voltage less than Ref4 generates a zero voltage. Thus, each highway line generates a positive pulse. Setting Ref4 at about two volts has been found satisfactory but the reference voltage can vary depending upon the circumstances. A smaller reference voltage, Ref4, will make the detector more sensitive, and may be desired for nighttime detection, but also increases the sensitivity to noise that may cause false alarms during daylight.

Figure 4:
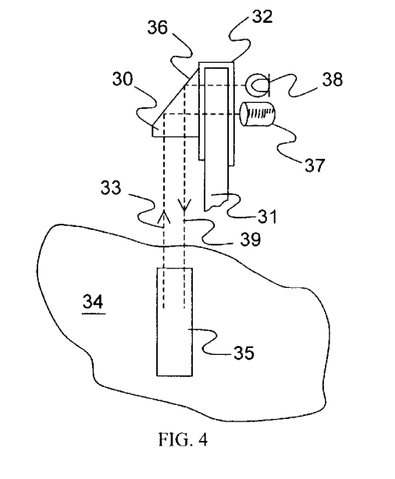
FIG. 4, a somewhat schematic representation of a light collector of the invention in place on a motor vehicle window.

A means for optical focusing of light reflected from a road surface onto a photodetector is shown in FIG. 4. Referring to FIG. 4, a prism 30 is mounted to the outside of a motor vehicle window 31 with mounting clip 32. Light 33 is reflected from the road surface 34 and lane dividing line 35 thereon to the reflecting surface 36 of the prism 30. The light entering the prism is reflected through the motor vehicle window 31 to the photodetector 37, mounted on the inside of the motor vehicle window 31. Photodetector 37 may also be mounted, using a mounting structure, not shown, on mounting clip 32 to maintain it in alignment with prism 30.

While during daylight hours, ambient light is reflected from line 35 as well as from road surface 34, more light being reflected from line 35 than from road surface 34, during hours of darkness it is necessary to provide light to be reflected from the road surface and lines. Unless the road surface is otherwise well lighted, or the sensor is directed far enough ahead of the vehicle to pick up reflected light from the vehicle headlights, a light source must be provided. Thus, the device of FIG. 4 includes a light source 38, such as an incandescent or halogen lamp, or LED or laser diode, mounted with photodetector 37, such as on clip 32, which produces a light beam 39 directed to road surface 34 in a manner that light reflected is directed to photodetector 37 as shown and described. Light source 38 can be activated separately or can be set up to go on automatically when vehicle headlights are turned on. with vehicles that keep the headlights on during the day as daylight running lights, light source 38 may be activated by a light sensing circuit that detects when the ambient light level on the road surface is not sufficient for detection of the lines and additional illumination is needed.

Figure 5:
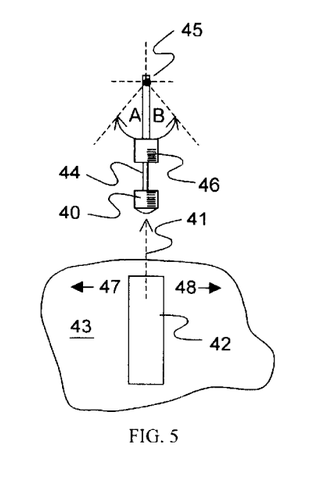
FIG. 5, a somewhat schematic representation of another embodiment of light collector of the invention.

In some situations, where drivers tend to cut corners, it may be desirable to mount the detector so that the viewing angle for the detector automatically changes as the vehicle turns a corner, thus detecting lines closer to a vehicle on the inside of a curve or farther away on the outside of a curve, i.e., the situation when a corner is cut. FIG. 5 shows a mechanical means to compensate the photodetector viewangle for a motor vehicle rounding a curve. The line of sight for the photodetector 40, i.e., the line 41 of reflected light from road line 42 or from the road surface 43, as shown in FIG. 5, extends from the highway line 42 to photodetector 40 and continues along rod 44 to pivot point 45. The view-angle A or B extends from a vertical line through the pivot-point 45 outwardly to the line of sight 41. As the vehicle is rounding a curve the centrifugal force on weight 46 mounted on rod 44 causes the photodetector 40 to move in a direction opposite the direction of the turn. Thus, if the vehicle turns in the direction of arrow 47, the detector 40 will swing in the direction of arrow 48 to give a view angle in the range of angle B. The faster the vehicle is moving and the greater the degree of the turn, the greater the angle B that will be formed. Similarly, in the instance the motor vehicle turns in the direction of arrow 48, view angle A increases. Depending upon the side of the vehicle on which the detector is mounted, the line of sight will move closer toward the vehicle or farther away from the vehicle to keep the road line 42 in line of sight 41 as the corner is cut. A light source for use in darkness will also generally be used, but is not shown here.

Figure 6:
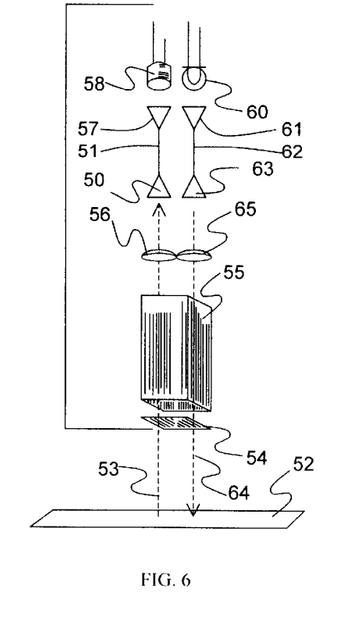
FIG. 6, a somewhat schematic representation, in assembly view, of a further embodiment of light collector of the invention.

FIG. 6 shows a further embodiment of a means for focusing light reflected from a road surface and road line onto a detector. In the embodiment of FIG. 6, shown in exploded view, the end 50 of a lightguide 51, similar to a fiberoptic cable, is used to collect reflected light from the road and direct it to the detector 58. Detector 58 may be located with the detection circuitry, such as that shown in FIG. 3, so as to eliminate a long wire cable from the detector to the detection circuitry, using the lightguide 51 in its place. The lightguide 51 eliminates spurious noise and unwanted signal components (interference) that might be generated with typical relatively long wire cables connecting the detector to the detection circuitry. This interference could result in erroneous highway line detection and degraded electronic operation. It should be noted that generally the change in light detected for a line as opposed to the highway surface is small, particularly in bright light with a light colored highway surface. Therefore, noise or other interference picked up by a cable can be of the same magnitude as the detected line signal and may trigger the detector. Thus, reduction of noise in the signal is generally desirable. In the embodiment of FIG. 6, light reflected from the highway line 52 along the line of sight 53 is partially filtered through filter 54 and passes through light shield 55 and is focused by lens 56 onto the end 50 of the lightguide 51. Light at the opposite end 57 of lightguide 51 is directed onto the remotely located photodetector 58.

For operation in darkness, a light source 60 is positioned next to photodetector 58, although it could be positioned at various other locations, and provides light to end 61 of lightguide 62. The light is projected from opposite end 63 of lightguide 62 as light beam 64 through lens 65, light shield 55, and filter 54 to the road surface. Filter 54 may be of various types such as a polarizing filter to reduce glare or a photochromic filter that gets darker as light gets brighter.

Figure 7:
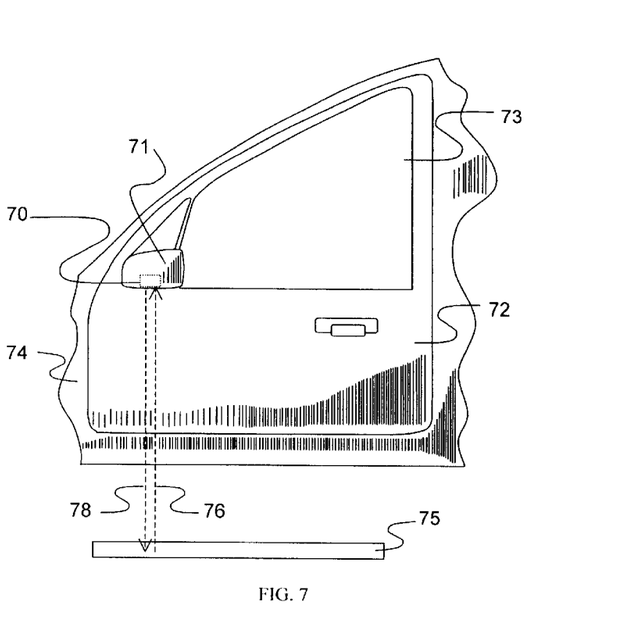
FIG. 7, a fragmentary side elevation of an automobile showing the invention mounted in a side door mirror.

FIG. 7 shows an optical assembly 70 mounted inside an outside vehicle rearview mirror 71 mounted on the vehicle door 72 near the side window 73. The forward portion of the motor vehicle is indicated at 74. Light travels from the highway line 75 along the line of sight 76 to the optical assembly 70, where it is directed to a light detector such as a phototransistor as described. The embodiment of FIG. 7 also includes a light source in optical assembly 70 for night use. The light source, when on, directs a beam of light 78 onto the road surface. Light reflected by the road line 75 is reflected as shown by reflected beam 76, to optical assembly 70 and the photodetector associated therewith. The actual optical assembly used may be similar to those shown and described for FIGS. 4–6, or variations thereof.

Figure 8:
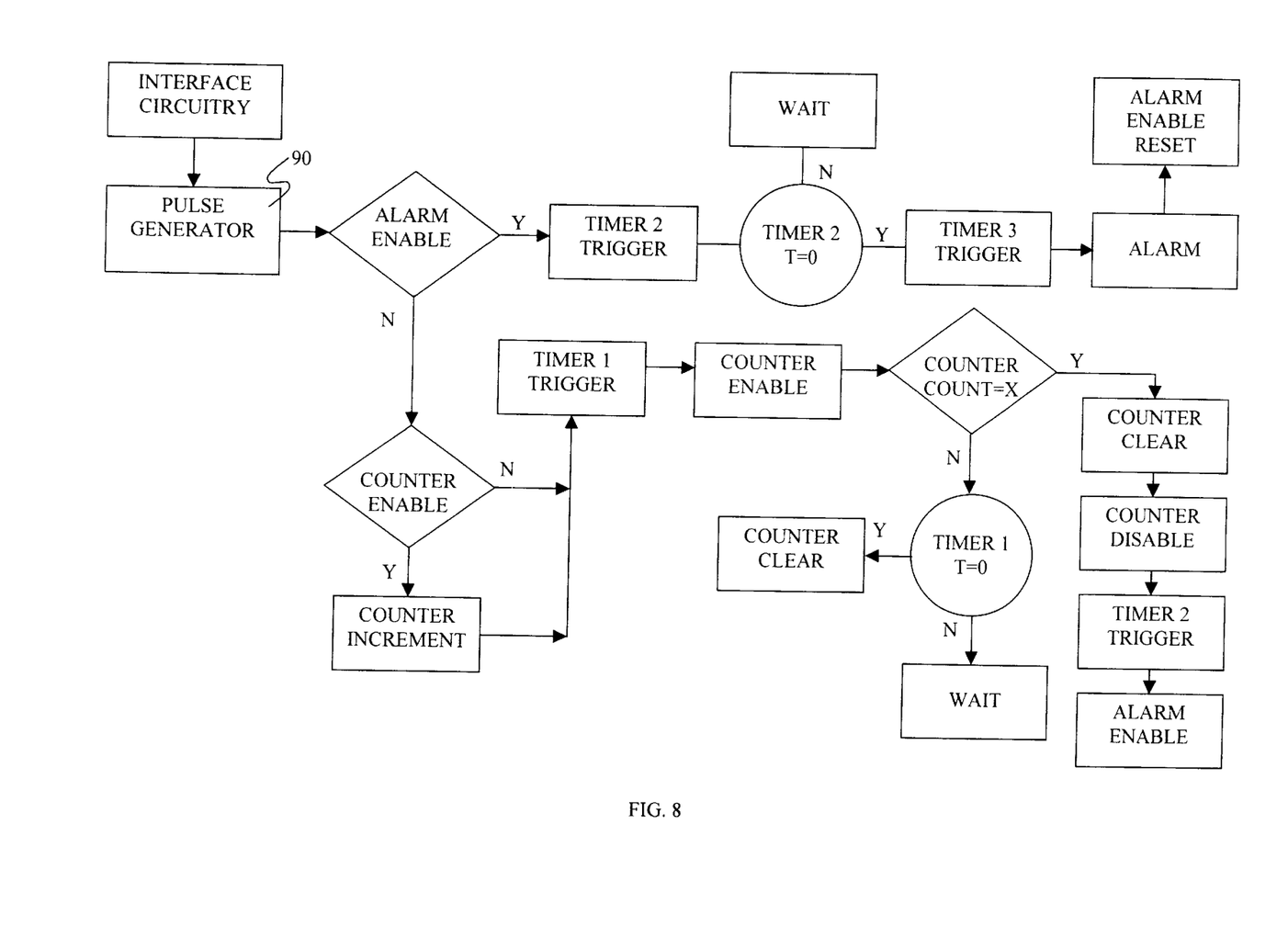
FIG. 8, a logic diagram of a portion of the circuitry of the invention.

FIG. 8 shows a logic flow block diagram of an optical highway line detector of the invention including an alarm to alert the motor vehicle driver when the vehicle drifts laterally out of the highway lane. It should be understood that two criteria for highway lane detection result due to the method highway lines are applied on the highway using a paint-truck equipped with a paint sprayer traveling at a specific vehicle speed and spraying lines at a specific time interval and for a specific duration. The first criterion is highway lines are periodic rather than random and the second is the time interval between highway lines is relatively constant. The logic flow shown in FIG. 8 utilizes these criteria to detect a highway line by comparing a specific number of highway lines expected at a specific speed range to a number stored in an asynchronous counter. This counter is implemented in the logic flow block diagram of FIG. 8 satisfying the two criteria by the number value (X) equaling the number of lines expected during the time interval Timer 1 is triggered. Referring to the flow diagram, the Peak Detector 26 output, which, as described for the circuitry of FIG. 3, is a negative pulse indicating the end of a detected line, or the Voltage Reference and Detector circuit 27 output which is a positive pulse when a line is detected, is provided to inputs of the pulse generator 90 resulting in a relatively short positive pulse in response to the output of the Pulse Generator. As a result of this positive pulse, the Alarm Enable logic circuit is tested to determine if the Alarm Enable is set, path Y or not set, path N. If the Alarm Enable is not set, such as at the start of operation of the device, path N is selected. In the instance path N is selected, the Counter Enable logic circuit is tested to determine if the Counter Enable is set. If the Counter Enable is not set, i.e., not enabled, path N is followed and Timer 1 is triggered to start timing and the Counter enabled to start counting. The count stored in the Counter is then tested to determine if the count is equal to X, X being a reference number set into the circuitry and representing the number of lines (pulses from pulse generator 90) expected during the time interval of Timer 1. X is an arbitrary member chosen as desired. x equals three has been found satisfactory although larger numbers may be used. The time interval of Timer 1 is chosen based upon the number X chosen and a speed during which time X number of lines would normally be detected at the chosen speed. The time interval for Timer 1 may be more accurately set if speed information is detected and taken into account. Without speedometer compensation, the time can be set to a time corresponding to an arbitrary speed. It has been found that setting Timer 1 and Timer 2 for an expected speed of about twenty-five miles per hour means that the detector does not work below twenty-five mph and does work above twenty-five mph. This is generally satisfactory. If the count in the Counter is not equal to X, path N is selected and the logic system waits for Timer 1 to time out at T=0. During the wait time, the Pulse Generator may generate another pulse. In the instance the Pulse Generator has not produced another pulse by the time Timer 1 reaches T=0, path Y is selected and the Counter is cleared. If another pulse is received before Timer 1 times out, nothing happens at the Timer 1 T=0 location. Since Timer 1 has not yet timed out, the circuit at that location just waits. However, when another pulse is received, the N path is followed from Alarm Enable, and, since the counter is now enabled, the Y path from Counter Enable is followed and the counter is incremented. At this point, Timer 1 is retriggered and the count in the counter is again tested to see if it equals X. If not, the N path is again followed and since Timer 1 has been retriggered and thus not yet timed out, nothing happens. If pulses continue to be generated by pulse generator 90, those pulses continue to be counted by the Counter in the manner just described and Timer 1 continues to be retriggered. If Timer 1 times out before the count in the Counter reaches X, the Y path is followed from Timer 1 T=0 and the Counter is cleared and reset and the operation of the logic circuitry continues as just described.

If, however, a pulse is generated by pulse generator 90 each time before Timer 1 times out, the count in the Counter will eventually equal X at the comparison step and path Y will be followed. At that time, the Counter is cleared, the Counter is disabled, Timer 2 is triggered to start timing, and the Alarm is enabled. Now, when a pulse is generated by pulse generator 90, the alarm is enabled and path Y is followed from Alarm Enable. Timer 2 is now triggered to start timing and is set to time out (T=0) in a time period during which it is expected that in normal course of line detection, a pulse would be generated by pulse generator 90. Again, the time period of Timer 2 can be more accurately set by taking into account vehicle speed information. If another pulse is generated before Timer 2 times out, the Y path is again followed from Alarm Enable and Timer 2 is triggered to start timing over again. With the Alarm enabled, the Alarm is prevented from activating by Pulse Generator pulses continuously triggering Timer 2. This is the Wait "state" where Timer 2 T=0, path N is selected. In the instance Timer 2 times out (no pulse is received before Timer 2 times out to reset Timer 2), path Y is selected from Timer 2 T=0. This indicates an alarm condition, i.e, the lines have been detected, but have stopped being detected which would occur if the vehicle has drifted laterally so the lines are no longer in sight of the detector and no longer being detected. The Alarm is activated and the Alarm Enable circuit is reset. At this time, the circuitry can reset automatically after the alarm is given for a predetermined period of time, such as after Timer 3 times out, or, to ensure the driver is aware of the potential alarm condition (the alarm could merely indicate that highway lines on the highway have disappeared), the alarm can remain on until the alarm is manually reset by the driver. When reset, the logic circuitry is reset and once lines are detected to count X number of lines, the alarm is again enabled to detect an alarm condition.

Figure 9:
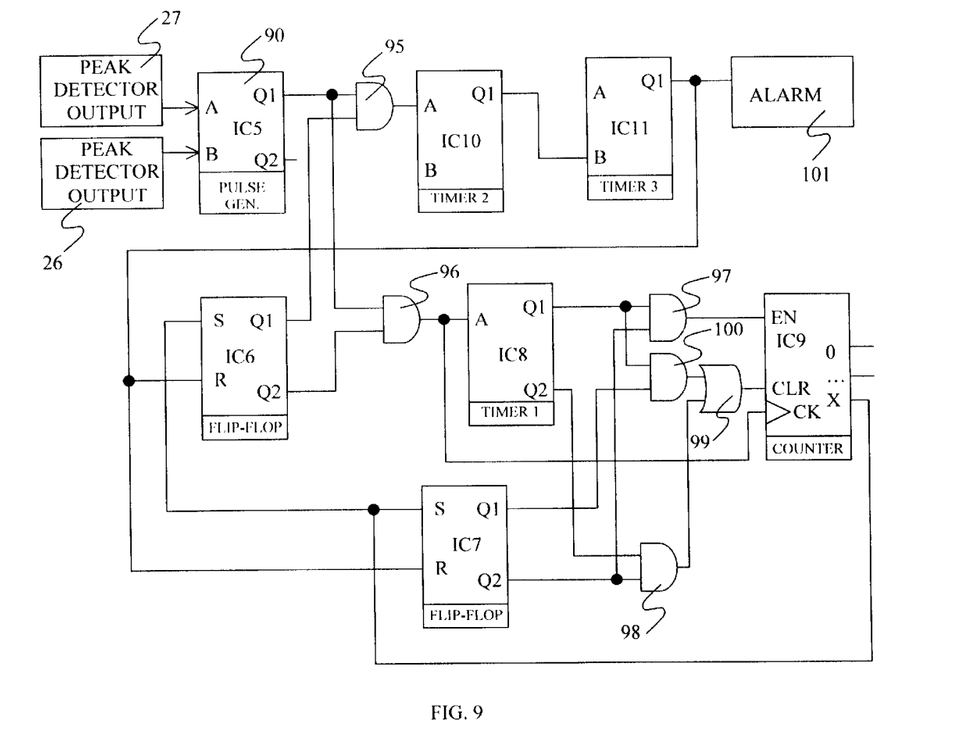
FIG. 9, a circuit diagram showing a circuit implementation of the logic of FIG. 8.

FIG. 9 shows a schematic realization of the logic flow block diagram of FIG. 8. Referring to FIG. 9, the interface circuitry output is provided to either the noninverting input "A" of Pulse Generator 90, indicated as IC5, for positive pulses produced by the voltage reference and detector circuitry 27 or to the inverting input "B" of Pulse Generator 90 for the negative pulses from the Peak Detector 26. Output pulses generated from the Q1 output of IC5 are provided to "AND" logic gates 95 and 96. Initially, flip-flops IC6 and IC7 are in their "Reset State" where the Q2 output of both flip-flops are at "logic 1". In this initial state, logic "AND" gate 96 is selected and the pulses originating from IC5 are provided to input "A" of IC8, corresponding to Timer 1 of FIG. 8, producing a high Q1 output thereby enabling asynchronous counter IC9, through "AND" gate 97, since the Q2 output of IC7 is high. This continues as long as pulses are received on the "A" input to IC8 before Timer 1 times out. If Timer 1 times out, the Q2 output of IC8 goes high providing a high to "AND" gate 98, which also has a high input from the Q2 output of IC7. This produces high outputs from "AND" gate 98 and "OR" gate 99 to reset counter IC9. In the instance the count stored in IC9 is equal to value "X", in this circuit a hardwired preselected count, output "X" becomes a "logic 1". This "logic 1" is provided to the "set" inputs of flip-flops IC6 and IC7 causing Q1 outputs of IC6 and IC7 to be a "logic 1". In this instance, pulses generated from the Q1 output of IC5 are provided to Timer 2, IC10, through "AND" gate 95, since IC6 has been set and its Q1 output to "AND" gate 95 is high. Also, at this time, since IC7 has been set, and its Q1 output is high along with the Q1 output of Timer 1, IC8, "AND" gate 100 provides a high output through "OR" gate 99 to clear the counter, IC9. With Timer 2, IC10, now timing, continually re-triggering input "A" of IC10 results in output Q1 of IC10 remaining in a "logic 1" state. In the instance Timer 2 is not re-triggered before timing out, the Q1 output of Timer 2, IC10, goes low. When the Q1 output of IC10 goes from a "logic 1" to a "logic 0" state, a Timer 3, IC11, triggers the Alarm 101 and resets flip-flops IC6 and IC7. Resetting of IC6 and IC7 start operation of the circuitry over again. The alarm will continue until Timer 3, IC11, times out. Also, the Q1 high output of Timer 3, IC11, provides a high signal to the R (reset) inputs of flip-flops IC6 and IC7 to reset them.

Figure 10:
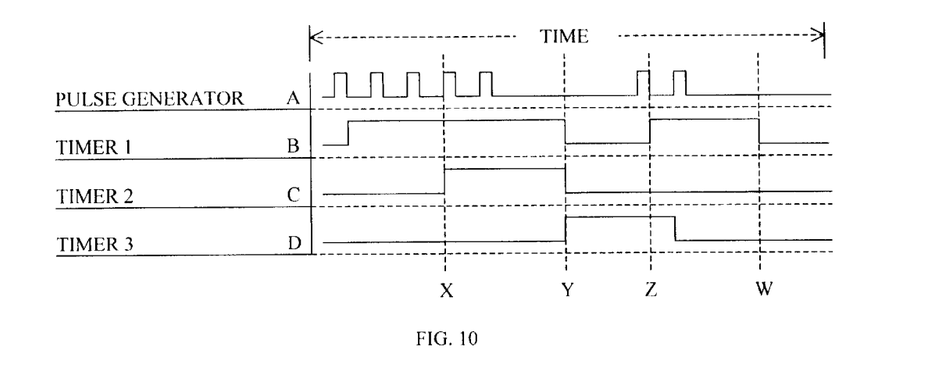
FIG. 10, a timing diagram showing signals associated with FIGS. 8 and 9.

The timing diagram of FIG. 10 shows a representative operation of the circuitry of FIG. 9. The number X in this example is three. The pulse generator provides a series of pulses A indicating highway lines sensed. With the first pulse sensed, Timer 1 is enabled and its output, B, goes high. Neither Timer 2 nor Timer 3 are enabled so their Q1 outputs, B and C, respectively, remain low at 0. As the pulses continue, they are counted, as described above. After three pulses are counted, the count in the counter equals X and Timer 2 is enabled. This is indicated by time X in FIG. 10.

With the next pulse, Timer 2 is triggered and starts timing and its Q1 output goes high (signal B). As indicated above, Timer 2 is retriggered with each pulse. However, if the pulses stop, as indicated after the second pulse between X and Y, although it could be after any number of counted pulses, Timer 2 will time out at time Y and its output Q1 goes to 0. This triggers Timer 3 whose output goes high as shown by signal D in FIG. 10 at time Y and the Alarm will be activated during the length of this output. Also, Timer 1 is reset and enabled. When Timer 3 times out, its Q1 output, signal D, returns to 0. The next pulse generated by the pulse generator, signal A, after an alarm is indicated will then start Timer 1, signal B, which goes high, as at time Z, and the cycle of operation starts again. As illustrated, however, only two pulses are counted after time Z so Timer 1 times out at time W and its output goes back to 0. The circuit is then ready to start operation again with the next pulse from the pulse generator.

Rather than the circuitry of FIG. 9, the counter and timers of FIG. 9 could be implemented with a microprocessor and microcode programs would cause the microprocessor to perform the counting and timing as described. The microprocessor also performs the logic or decision-making functions shown in FIG. 8 including alarm activation. Further, the microprocessor registers could store much larger counts than the components shown in FIG. 9, and allow a much greater precision for calculating the line timing intervals using the microprocessor arithmetic logic unit.

Figure 11:
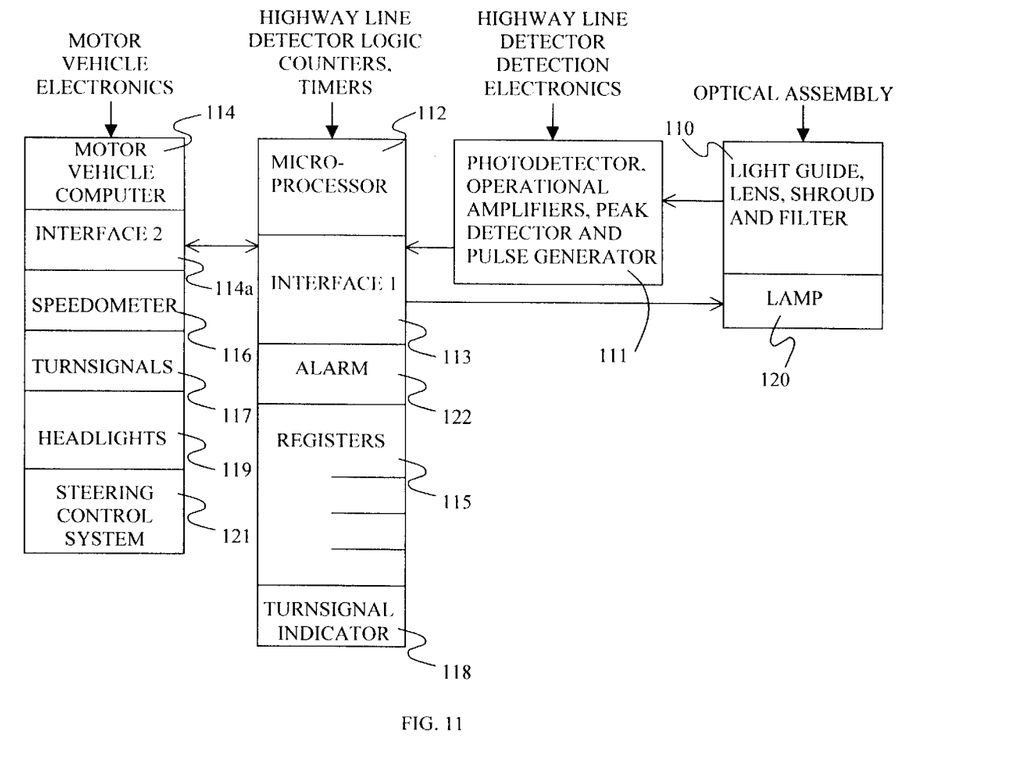
FIG. 11, a schematic block diagram of a system of the invention installed in a vehicle showing the interface of the system with the vehicle electrical system.

The highway line detector as described can be a stand alone unit in a motor vehicle, or it can be integrated into a motor vehicle's electrical system. FIG. 11 shows a motor vehicle electrical system and its interface with a microprocessor implemented optical highway line detector of the invention. The optical assembly 110 comprises the fiberoptic cable, lens, shroud, filter, and lamp shown in FIG. 6, although any of the other optical assemblies could be used. The light from the optical assembly is processed by the highway line detector detection electronics 111 which includes the photodetector and interface electronics of FIG. 3 and the pulse generator of FIGS. 8 and 9. The logic circuitry is provided by microprocessor 112. Signals from the pulse generator are fed to microprocessor interface circuitry 113 which communicates with microprocessor 112. The motor vehicle electrical system also is connected to microprocessor interface circuitry 113 either through the Motor Vehicle Computer 114, Motor Vehicle Computer interface circuitry 114a, or through individual sensors which provide speedometer, turnsignal, headlight, and steering control system information directly to interface 113. The advantages of integrating the vehicle electrical system with the line detector of the invention is that the detector can be programmed to automatically set the detector parameters, e.g., number of lines expected to be detected in a particular time period in response to vehicle speed, operation of the light source in response to operation of the headlights or ambient light sensed, and operation of the alarm in response to the turnsignals. For example, the highway line interval count could be stored in a microprocessor register 115 and compared to the motor vehicle Speedometer value 116 to provide validation that the optical highway line detector is actually detecting highway lines, greatly increasing the confidence in the system performance. Further, with speed information, the spacing of detected lines can be determined to differentiate various types of lines. For example, exit lines are closer together so have a higher frequency of detection than do lane dividing lines. Turnsignal information 117 from the Motor Vehicle Computer interface 114a could provide an electronic signal that would disable the alarm 122 in the event that the motor vehicle driver was intentionally making a lane change as indicated by operation of the turnsignal. Once the motor vehicle is steered back into a highway lane as indicated by line detection, the optical highway line detector system could activate a Turnsignal On Indicator 118 to alert the driver if the turn signal has not been turned off, or optionally the turn signal could be turned off automatically following the lane change. When the motor vehicle headlights 119 are turned on, the Interface senses this condition and the light source supplying light for the detector, 120, is turned on. If the vehicle itself has an ambient light detector, such ambient light detector can be used. For motor vehicles with an electronic steering and control system, the Interface 113 can send control signals from the Microprocessor 112 to the Steering Control System 121 to steer or assist steering of the motor vehicle.

Figures 12, 13:
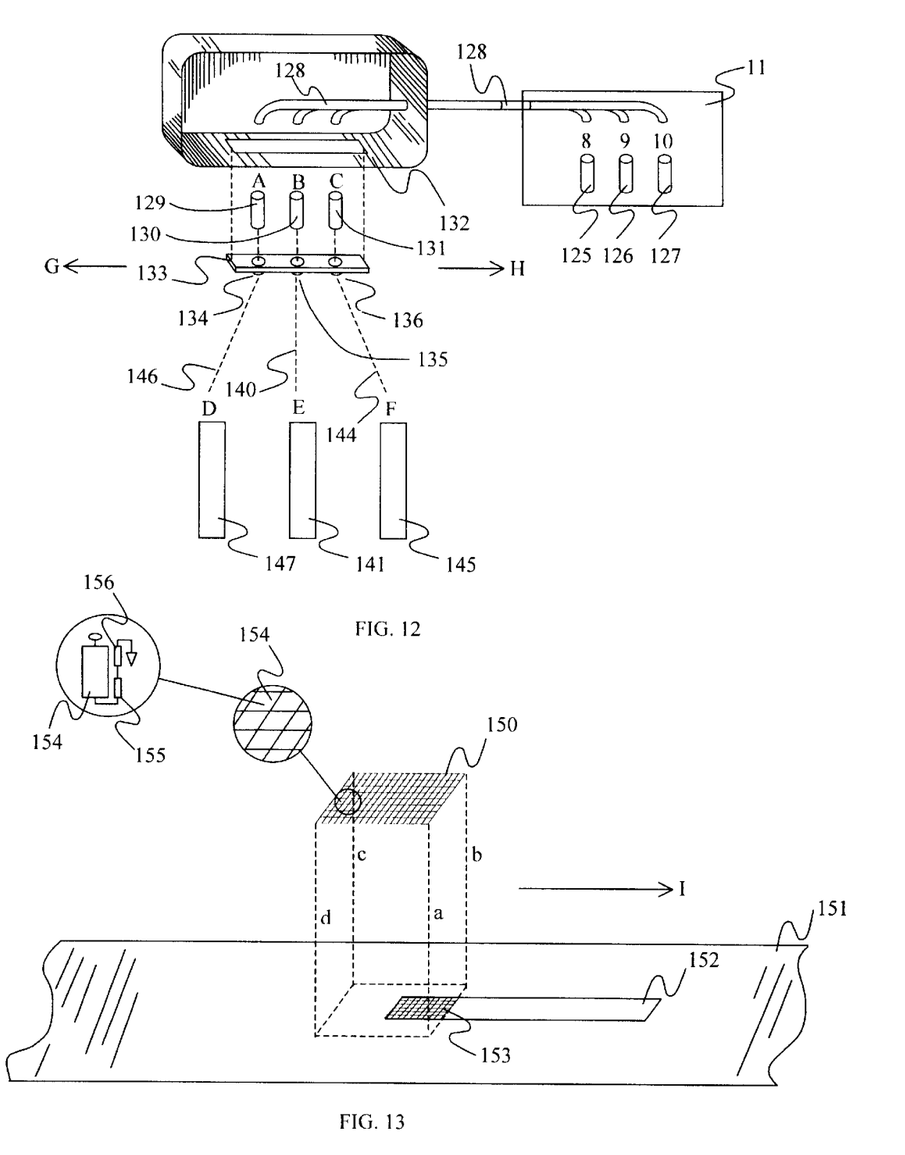
FIG. 12, a somewhat schematic showing of a further embodiment of a light collector of the invention.
FIG. 13, a somewhat schematic showing of a still further embodiment of a light collector of the invention using a plurality of photodetectors and associated dynamic impedance elements.

FIG. 12 shows a detector with a plurality of photodetectors, here three photodetectors 125, 126, and 127, shown somewhat schematically in light communication through lightguide 128 with light collectors 129, 130, and 131 mounted, such as in a motor vehicle side mounted rear view mirror cavity 132 by mounting plate 133, to detect light reflected by a highway surface on which the vehicle is traveling. The detectors and individual light collectors 134, 135, and 136 arranged so that when the vehicle is in the middle of a lane, center lens 135, along the line of sight 140 to highway line 141 will be more dominant, i.e., will receive more reflected light, and side lenses 134 along line of sight 146 and lens 136 along line of sight 144 (neither line 147 nor line 145 will be as illustrated in FIG. 12 since the position of the line is shown by line 141) will receive nearly equal amounts of reflected light from the highway surface without a line or from only opposite side portions of the line. As the motor vehicle drifts laterally to the left in the direction of arrow G, the lens 136 along the line of sight 144 to highway line 145 (this is the same line as 141 but is now in a different position relative to the vehicle and detector since the vehicle has moved to the left) will be more dominant. Similarly when the motor vehicle is drifting laterally to the right in the direction of arrow H, lens 134, along the line of sight 146 to highway line 147 (again, the same line as 141 and 145, but in a different position relative to the vehicle and detector) will be more dominant. A minimum of two photodetectors are required to determine lateral direction of motor vehicle drift (with two, when centered on the line, the output will be nearly equal and drift will cause one or the other to be dominant), however, more than three detectors can be used for greater motor vehicle lateral drift detection resolution.

FIG. 13 shows an array of solid state photodetectors 150 directed toward a highway 151 so that highway line 152 can be sensed and detected by a plurality of photodetectors in the array. The array could consist of hundreds or even thousands of individual photodetectors. As the motor vehicle moves forward in direction I along a highway, some of the photodetectors 153 in the line of sight indicated between lines a, b, c, and d extending from the corner of array 150 begin to detect the highway line 152 on highway 151. The photodetectors 153 detecting the line are shown superimposed on line 152 under the array. This configuration would provide a high-resolution image of the highway line. The detectors 150 can all be formed in a single chip and the series zener diodes could be formed with each detector on the chip. This is shown by the enlarged portion of the array showing one photodetector 154 and schematically its connection to zener diodes 155 and 156. With this arrangement, each photodetector of the array would have a similar construction.

Figure 14:
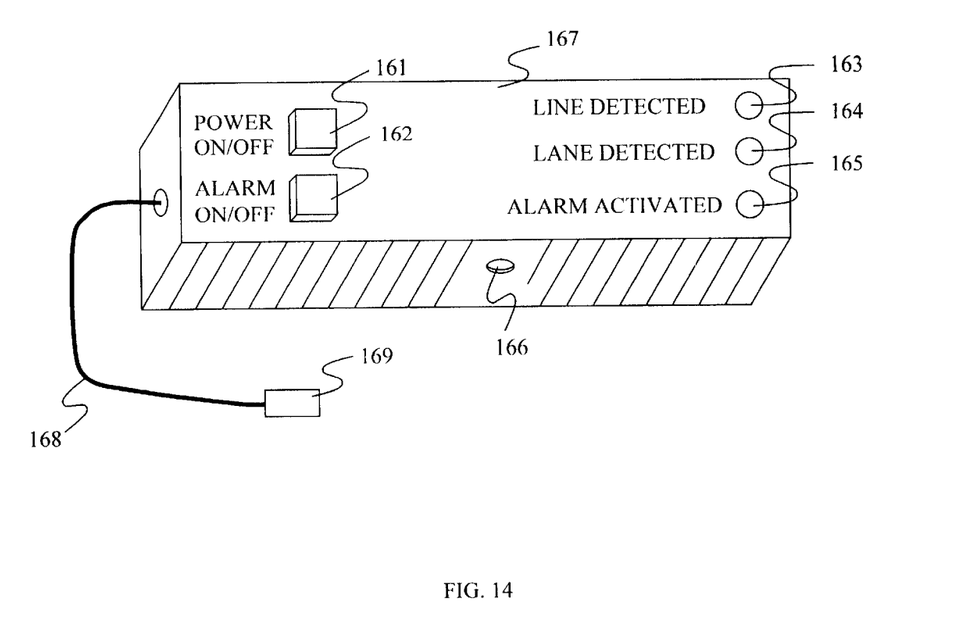
FIG. 14, a pictorial view of a device of the invention showing how it can be packaged.

FIG. 14 shows an example of a simple realization of packaging for an optical highway line detector including a Power On/Off switch 161 to turn the power on to the device, and an Alarm On/Off switch 162 which allows the alarm to be enabled as described above when operation of the detector is desired. A Line Detected indicator 163 gives a visual indication each time a line is detected by the detector. A Lane Detected indicator 164 provides a visual indication when X number of lines have been detected in the set time which indicates a lane has been detected. The Line Detected and Lane Detected indicators preferably operate whenever the power is on and are not dependent on the alarm being enabled. An Alarm Activated indicator 165 provides a visual indication of an alarm situation and an audio alarm 166 in case 167 provides an audio alarm to the driver. One end of a fiberoptic cable 168 attaches to a lens assembly 169 and provides a conduit for light to the opposite end that attaches to case 167 and provides the light to the photodetector or photodetectors mounted inside case 167. Any of the optical systems described, or other optical systems, can be used to supply light from the highway and highway lines to lens 169.

Figure 15:
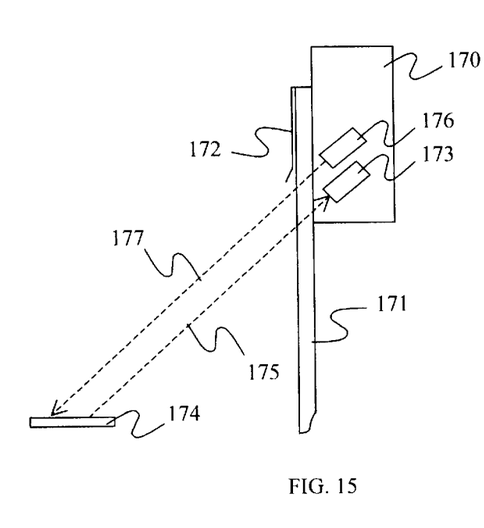
FIG. 15, a somewhat schematic showing of a still further embodiment of an aftermarket removable light collector of the invention.

The photodetectors shown in the figures can optionally be placed on the passenger side of the vehicle or on both driver's side and passenger side. It should be noted that although the detectors are shown pointing downward, the detectors could be directed at any angle, forward or reverse and laterally to the left or right of the motor vehicle. For example, as shown in FIG. 15, a detector 170 is adapted to be mounted on the inside of a vehicle window 171 by clip 172. A photodetector 173 is aimed at an angle through the window 171 to detect light reflected from highway line 174 along line of sight 175. A light source 176 is aimed at a similar angle to shine light onto the highway, when needed, along line of sight 177.

While the detection scheme of the invention has been described as detecting discontinuous roadway lane dividing lines, such as the discontinuous lines dividing multiple lanes traveling in the same direction or lanes of opposite travel direction, and providing an alarm indication when such discontinuous lines are no longer detected, it will be realized that the detector of the invention merely detects the presence or absence of a line. Thus, the detector can be used with various processing circuits to provide an alarm if a line is detected, if a continuously detected line is lost, etc. For example, rather than setting the detector to continuously monitor the discontinuous lines and provide an alarm indication when the discontinuous lines are not continuously detected, the system could be set so that the alarm signal would be given when a line, either a continuous or discontinuous line, is detected. With such a system, the detector would be focused close to the side of the vehicle so that no lines are detected when the vehicle is properly positioned in its lane. If the vehicle drifts from a position in the lane between the lines, a line is detected (this could be a discontinuous line or a continuous line) and the alarm is given to indicate movement toward or over a line. This system can be used on both sides of a vehicle and will work with discontinuous lines dividing lanes or solid lines often provided along the edge of a road. Alternatively, the system could be set to monitor the presence of either a discontinuous lane dividing line or a solid road edge line and provide an alarm when no line is sensed. These various options could all be programmed into the system circuitry and be selectable by the user depending upon road conditions.

Whereas the embodiment of the invention shown in FIG. 13 is described in connection with line detection or detection of light areas on darker, but bright, backgrounds, the embodiment of FIG. 13 provides a camera which provides brightness compression and compensation and ensures that none of the camera elements will saturate even in very bright conditions, and in very bright conditions, even dark areas will show good contrast. In referring to detecting light areas on a background or surface, it is meant to include various elements of a picture which include light and dark areas, and provide compensation in a solid state camera.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A detector for detecting light reflected from a light area on a surface, comprising:
   a photodetector positioned to receive light from a portion of the surface; and
   a dynamic impedance element connected electrically in series with the photodetector to maintain the photodetector in condition to detect light reflected from a light area on the surface regardless of the ambient illumination of the surface.

2. A detector for detecting light reflected from a light area on a surf ace according to claim 1, wherein the dynamic impedance element is at least one reversed biased zener diode.

3. A detector for detecting light reflected from a light area on a surface according to claim 2, wherein the at least one zener diode has a breakdown zener voltage, and the maximum expected voltage produced across the photodetector as connected with the zener diode in detecting ambient light reflected from the surface is less than the zener breakdown voltage.

4. A detector for detecting light reflected from a light area on a surface according to claim 3, wherein the photodetector is a phototransistor.

5. A detector for detecting light reflected from a light area on a surface according to claim 2, wherein the at least one zener diode is a series connection of two zener diodes.

6. A detector for detecting light reflected from a light area on a surface according to claim 5, wherein the detector additionally includes a plurality of photodetectors and associated series zener diodes.

7. A detector for detecting light reflected from a light area on a surface according to claim 6, wherein differences in light detected by different photodetectors indicate detection of the light area and position of the light area relative to the detector.

8. A detector for detecting light reflected from a light area on a surface according to claim 1, wherein the detector additionally includes a plurality of photodetectors and associated series dynamic impedance elements.

9. A detector for detecting light reflected from a light area on a surface according to claim 8, wherein differences in light detected by different photodetectors indicate detection of the light area and position of the light area relative to the detector.

10. A detector for detecting light reflected from lines on a highway surface from a moving motor vehicle, comprising:
   a photodetector mounted to receive light reflected from the lines in a predetermined manner when the vehicle is properly within a lane but not otherwise;
   an alarm to, once enabled, provide an indication when light is received by the photodetector in other than the predetermined manner; and
   a dynamic impedance element electrically connected in series with the photodetector to maintain the photodetector in condition to detect light reflected from a line regardless of ambient illumination of the highway and line.

11. A detector according to claim 10, wherein said dynamic impedance element includes a reverse biased zener diode.

12. A detector for detecting light reflected from lines on a highway surface according to claim 10, further comprising:
   an optical system for directionally focusing reflected light onto the photodetector;
   an amplifier electrically connected at the junction of the photodetector and dynamic impedance element for amplifying changes in the output signal from the photodetector with respect to the dynamic impedance element; and
   circuitry for producing an output in response to the output of the amplifier for each line detected.

13. A detector for detecting light reflected from lines on a highway surface according to claim 12, wherein the circuitry for producing an output produces a pulse , and such circuitry is circuitry for detecting peaks in the output of the amplifier and producing a pulse for detected peaks.

14. A detector for detecting light reflected from lines on a highway surface according to claim 12, wherein the circuitry for producing an output produces a pulse, and such circuitry is voltage reference and detector circuitry for producing a pulse for detected lines.

15. A detector for detecting light reflected from lines on a highway surface according to claim 12, wherein the output produced for each line detected 15 sent to logic circuitry which determines if the light is received in the predetermined manner, and if not, activates the alarm.

16. A detector for detecting light reflected from lines on a highway surface according to claim 15, wherein the lines detected are discontinuous lane dividing lines and the predetermined manner for receiving the reflected light is to receive light indicating a line within each of successive fixed time periods.

17. A detector for detecting light reflected from lines on a highway surface according to claim 16, wherein the logic circuitry is a programmed computer.

18. A detector for detecting light reflected from lines on a highway surface according to claim 10, further including logic circuitry to determine if the light has been received by the photodetector in other than the predetermined manner and to activate the alarm if the light has been received in other than the predetermined manner.

19. A detector for detecting light reflected from lines on a highway surface according to claim 18, wherein the logic circuitry is a programmed computer.

20. A detector for detecting light reflected from lines on a highway surface according to claim 10, additionally including a light source directed to illuminate the highway surface being sensed when ambient light is not sufficient to illuminate the lines for detection.

21. A detector for detecting light reflected from highway lines on a highway surface according to claim 10, wherein the detector additionally includes a plurality of photodetectors and associated series dynamic impedance elements.

22. A detector for detecting light reflected from a light area on a surface according to claim 20, wherein differences in light detected by different photodetectors indicate detection of the light area and position of the light area relative to the detector.

23. A detector for detecting light reflected from discontinuous lane dividing lines on a highway surface from a moving motor vehicle, comprising:
   a photodetector mounted to receive light reflected from the discontinuous lane dividing lines when the vehicle is properly within a lane but not otherwise;
   circuitry to produce a pulse for each lane dividing line sensed;
   logic circuitry to determine if a pulse is produced, indicating a line sensed within successive fixed periods of time in which it is expected that a line should be sensed; and
   an alarm to, once enabled, provide an alarm indication if the logic circuitry determines an alarm condition exists.

24. A detector according to claim 23, additionally including a light source directed to illuminate the highway surface being sensed when ambient light is not sufficient to illuminate the lines for detection.

25. A detector for detecting light reflected from a light area on a surface according to claim 23, wherein the detector additionally includes a plurality of photodetectors and associated series dynamic impedance elements.

26. A detector for detecting light reflected from a light area on a surface according to claim 23, wherein differences in light detected by different photodetectors indicate detection of the light area and position of the light area relative to the detector.

27. A detector according to claim 20, wherein the logic circuitry is a programmed computer.

28. A method for detecting whether a vehicle is maintaining position in a highway lane marked by at least one set of discontinuous lane dividing lines on the highway surface, comprising the steps of:
   detecting, using a photodetector, discontinuous lane dividing lines marking the lane in which the vehicle is traveling;
   determining through logic circuitry if a line is detected in each of a succession of time periods in which it would be expected lines would be detected if the vehicle stayed in the lane and detected such lines; and
   giving an alarm if such lines are not detected in each of the expected successive time periods, such lines not being detected indicating the lines are not being sensed and possible drift of the vehicle out of the lane.

* * * * *